Aug. 16, 1949.  W. BUCHELE  2,479,204
METHOD OF GRINDING TELEVISION CORRECTOR PLATES
Filed Dec. 27, 1947  2 Sheets-Sheet 1
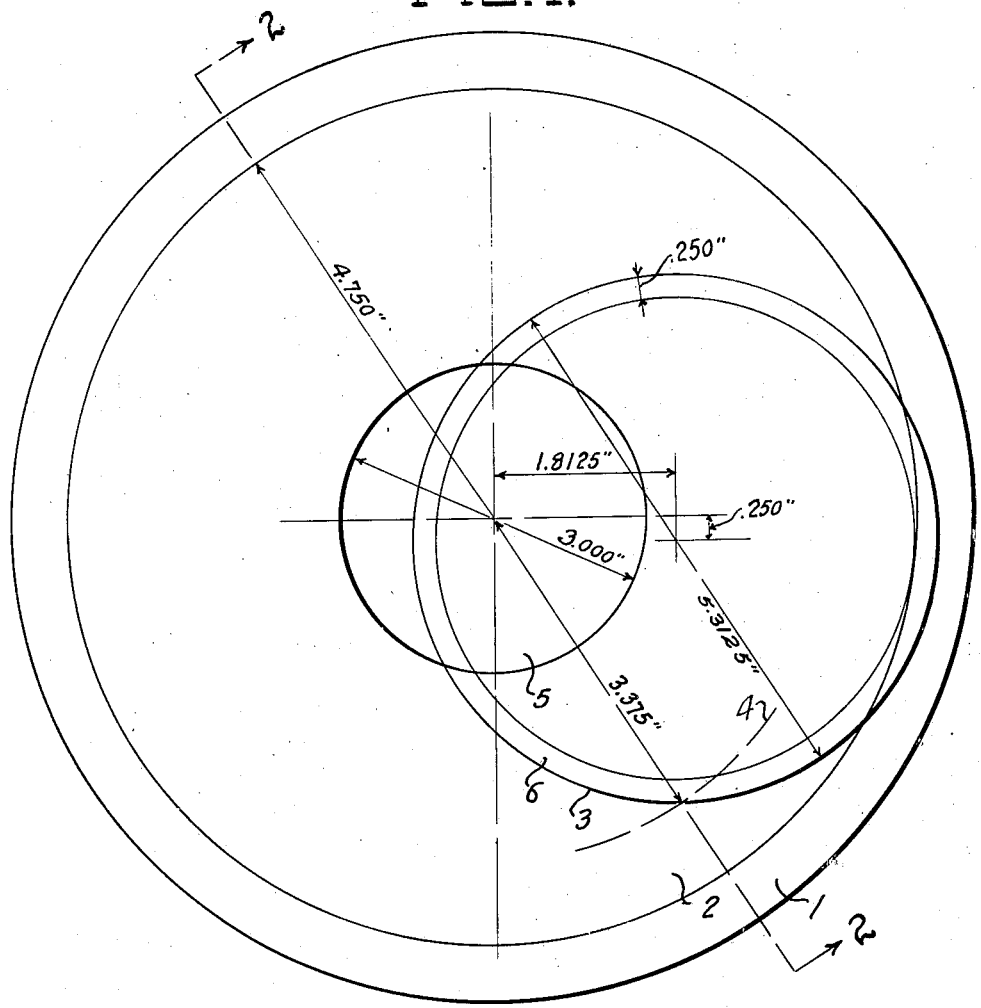
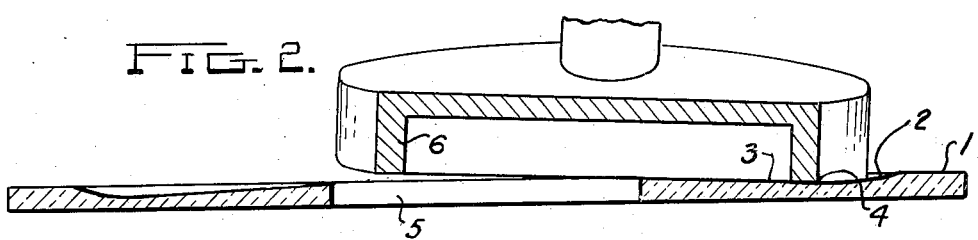
INVENTOR.
William Buchele
BY
ATTORNEYS Aug. 16, 1949.  W. BUCHELE  2,479,204
METHOD OF GRINDING TELEVISION CORRECTOR PLATES
Filed Dec. 27, 1947  2 Sheets-Sheet 2
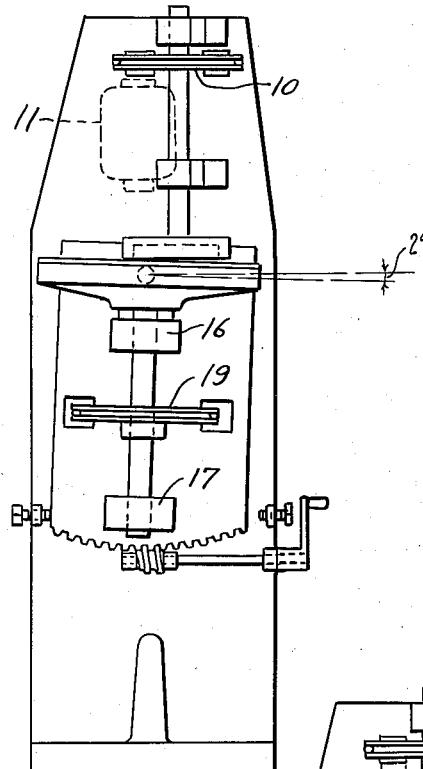
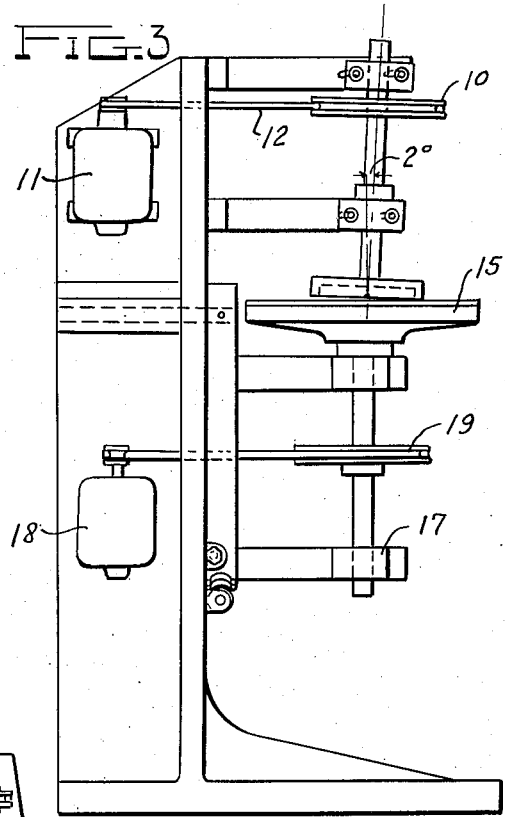
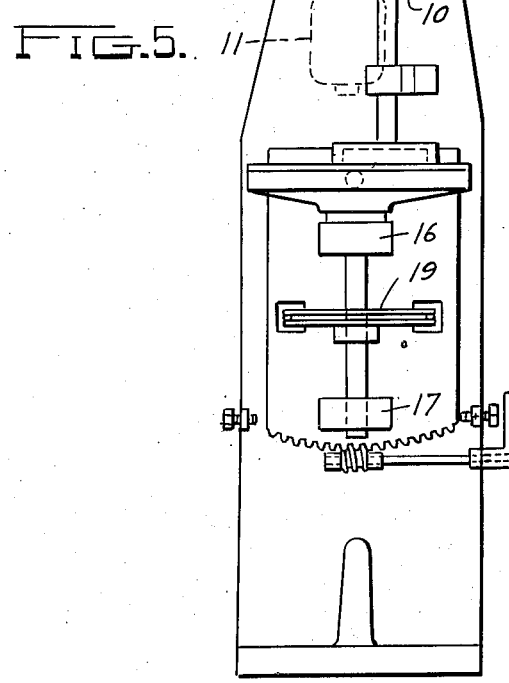
INVENTOR.
William Buchele
BY
ATTORNEYS Patented Aug. 16, 1949

2,479,204

UNITED STATES PATENT OFFICE 2,479,204

METHOD OF GRINDING TELEVISION CORRECTOR PLATES

William Buchele, Toledo, Ohio

Application December 27, 1947, Serial No. 794,197

3 Claims. (Cl. 51—283)

This invention relates to a method of manufacturing television corrector plates and similar optical devices.

The corrector plates used in certain types of television receivers in which the image from the face of a cathode ray tube is projected onto a spherical mirror and reflecting therefrom onto a viewing mirror, have previously been made by molding the plate to the configuration of a previously machined die or mold. The configuration of the mold is the negative of the curve desired in the corrector plate which involves an optical system developed in accordance with a series of formulae known as a Schmidt system, and the plates themselves have become known as Schmidt corrector plates. In some instances, the molding has been done under pressure and in other instances the material of the corrector plate (commonly optical glass) is permitted to sag under the influence of gravity, while hot, to the configuration of the mold. In either event plates formed in this manner have been found to be satisfactory in use, but relatively expensive since the molds require extremely careful machining and the production from each mold is necessarily limited as a considerable time is required to mold a single plate. Further, molded plates require individual testing and corrective polishing, if all traces of spherical aberration introduced by the first reflecting mirror are to be removed.

It is the primary object of the present invention to provide a method of manufacturing corrector plates which greatly reduces the cost of such plates as used for the removal of spherical aberration from the image reflected by a spherical mirror and ultimately displayed on a flat surface.

Another object of the invention is to provide a method of manufacturing such plates in which only grinding and polishing steps are involved, to the exclusion of all casting operations.

Another object of the invention is to provide a method for the production of such plates in which the grinding and polishing can be carried out to a high degree of accuracy in a limited period of time, and in which final correction requirements are reduced to a minimum.

Other objects and advantages of the invention will become apparent from the following description of a specific form of corrector plate and method of producing it. For purposes of illustration, the invention will be described in conjunction with accompanying drawings in which—

Figure 1 is a top plan view of a corrector plate diagrammatically indicating the disposition of a grinder by which the plate is formed; Fig. 2 is a section on the diameter 2—2 of the plate shown in Fig. 1; Fig. 3 is a side elevation of a machine suitable for carrying out the present method; Fig. 4 is a front elevation of the machine shown in Fig. 3 showing the position of the plate during the initial grinding step, and Fig. 5 is a view similar to Fig. 4, but indicating the position of the parts after the final operation.

Referring to the drawings, and particularly to Fig. 2, the cross-section of a Schmidt corrector plate consists of a substantially flat outer perimeter 1, generally referred to as an overhang, which lies entirely outside of the optical area of the plate and is used primarily for mounting purposes. Immediately inside the overhang, the plate is cut to a concavo-convex configuration in accordance with the Schmidt formula, which configuration includes an outer relatively steep concave curve 2 which merges with an upwardly extending, gently sloping concavity 3. The gradient of the curves 2 and 3 gradually approaches zero so that the curves merge on a line 4 which may be said to be a circular zone of zero slope, the zone being, however, of almost infinitely small width. At or near the point where the concave surface 3 again would, according to the Schmidt formula, reverse its slope to become convex, the plate is drilled or otherwise formed with a large center hole 5 for the reception of the neck of a conventional cathode ray tube. In those optical systems in which this hole is absent, the Schmidt curve requires a convex area and then a flat center area since the rays from the center portion of the spherical mirror require little correction. In the present instance, the hole 5 is shown disposed centrally of the corrector plate, but in some optical systems, this hole is offset slightly from the center. Variations of this character do not affect the present invention.

The method of manufacture according to the present invention consists in grinding with a conventional cup-shaped grinder and polisher designated 6 carried by a spindle which is offset from the axis of the corrector plate by an amount slightly less than the radius of the grinder. The grinder thus overlaps the center area as indicated in Fig. 1 and, if the glass to be ground and the grinder were in the same plane, grinding would take place beyond the diameter of the glass. The grinder diameter is such that the periphery extends to the outer-most point of the optical area, of course. The grinder is rotated and at the same time, the plate is likewise rotated about its center so that all surfaces of the plate are presented equally to the grinder.

As indicated in Figs. 3 and 4, the grinding spindle designated 10 is driven by an electric motor 11 through a belt 12 and the axis of the spindle is tilted forwardly at a predetermined angle, indicated as 2°, so that initially there is only a point contact between the grinder and the material from which the corrector plate is to be made.

Further, as indicated in Fig. 4, the plate is carried by a table 15 mounted on a spindle journaled in bearings 16 and 17 and rotated through the medium of an electric motor 18 and a belt 19. Initially the plane of the table is parallel to the plane of the grinder laterally of the grinder. In this position grinding continues until the desired depth of cut is reached. The table is then tilted laterally slowly until a predetermined angle, indicated as 2° in Fig. 5, is reached. Grinding continues during this tilting so that the line of contact between the grinder and the plate moves slowly towards the center and correction of this area of the plate is established. The amount of glass to be removed during this latter tilting operation is usually small, in the order of .005" to .006" so that the grinding is accomplished quickly.

The invention can best be put into practice by others skilled in the art by utilizing the dimensions and settings indicated in the drawings. For the production of a corrector plate having an effective optical diameter of 8.375" with a center hole of 3", a cup-shaped grinder having a diameter of 5.3125" with a wall thickness of .250" has been found satisfactory. The axis of the grinder is offset 1.8125" and set forwardly of the lateral diameter of the corrector plate .250". This setting produces a corrector plate having the deepest point of concavity as a circle 3.375" from the center of the effective optical area and the resulting curve will be accurately within the Schmidt formula. For different formulae, changes may be made in the degree of tilt introduced into the grinding spindle setting and table setting, and the grinding may be carried out to different depths. Obviously, the choice of size of corrector plate and degree of correction depend on the size of the spherical mirror and the focal length of the optical system.

While the invention has been described in connection with a specific setting of the parts of a grinding machine, the method is, of course, capable of application in other machines and with other settings.

What I claim is:

1. In the method of producing a corrector plate involving a Schmidt optical system the steps which comprise tilting a cup-shaped grinder with respect to the plane of a flat plate, the axis of rotation of the grinder being off-set from the center of the plate, grinding to a predetermined depth by rotating the grinder and the plate, then tilting the plane of the plate in a direction normal to the tilt of the grinder and meanwhile continuing the rotation of the grinder against the surface of the rotating plate, thus producing a surface having an outer sharply concaved area merging with an inner surface of continuously increasing radius of curvature.

2. The method in accordance with claim 1 and limiting the diameter of the grinder to more than half the effective optical area of the corrector plate and less than two-thirds of such area.

3. The method in accordance with claim 2 and establishing the axis of the grinder at a point offset from the diameter of the corrector plate in the direction towards which the grinder is tilted.

WILLIAM BUCHELE.

REFERENCES CITED

The following references are of record in the file of this patent:

UNITED STATES PATENTS

| Number | Name | Date |
| --- | --- | --- |
| 1,401,831 | Taylor | Dec. 27, 1921 |
| 2,065,103 | Simpson | Dec. 22, 1936 |
| 2,356,499 | Beduneau | Aug. 22, 1944 |